United States Patent [19]

Nakamura

[11] 4,370,581
[45] Jan. 25, 1983

[54] MULTILAYERED COIL STRUCTURE
[75] Inventor: Yoshimitsu Nakamura, Settsu, Japan
[73] Assignee: Matsushita Electric Works, Ltd., Osaka, Japan
[21] Appl. No.: 158,497
[22] Filed: Jun. 11, 1980

Related U.S. Application Data
[63] Continuation of Ser. No. 945,836, Sep. 26, 1978, abandoned.

[30] Foreign Application Priority Data
Sep. 30, 1977 [JP] Japan .................. 52-118125

[51] Int. Cl.³ ............................................. H02K 3/00
[52] U.S. Cl. ........................................ 310/198; 310/266; 29/598
[58] Field of Search ................ 310/179, 71, 180, 184, 310/200-207, 198, 208, 156, 265, 266, 42, 234; 29/597, 598

[56] References Cited
U.S. PATENT DOCUMENTS

| | | | |
|---|---|---|---|
| 3,360,668 | 12/1967 | Faulhaber | 310/266 |
| 3,694,684 | 9/1972 | Futterer | 310/198 |
| 3,995,364 | 12/1976 | Kristiansen | 310/266 X |
| 4,039,876 | 8/1977 | Takasaka | 310/266 |
| 4,060,746 | 11/1977 | Heyraud | 310/266 |
| 4,103,196 | 7/1978 | Saito | 310/266 |
| 4,200,817 | 4/1980 | Bratoljic | 310/201 |
| 4,236,295 | 12/1980 | Nakamura | 29/598 |

FOREIGN PATENT DOCUMENTS

| | | | |
|---|---|---|---|
| 1231257 | 9/1960 | France | 310/198 |
| 1419855 | 10/1965 | France | 310/198 |
| 549302 | 3/1974 | Switzerland | 310/198 |
| 549305 | 3/1974 | Switzerland | 310/198 |
| 1046993 | 11/1966 | United Kingdom | 310/198 |
| 1051467 | 12/1966 | United Kingdom | 310/198 |
| 1344144 | 1/1974 | United Kingdom | 310/198 |
| 1395152 | 5/1975 | United Kingdom | 310/198 |

Primary Examiner—R. Skudy
Attorney, Agent, or Firm—Burns, Doane, Swecker & Mathis

[57] ABSTRACT

A cylindrically-shaped multilayered coil structure comprises a plurality of diagonally wound coil sections extending circumferentially around the coil. Each section includes inner and outer layers. Each such layer includes initial and final turns. During winding of the coil, after the final turn of an inner layer is wound, the coil wire is wound to form a crossing part which extends back to the initial turn of the inner layer of that same section. Winding of the outer layer of that section is then performed. Subsequent coil sections are wound in a similar manner. The crossing parts are sandwiched between the respective inner and outer layers and comprise continuous unbroken sections of the coil wire.

6 Claims, 8 Drawing Figures

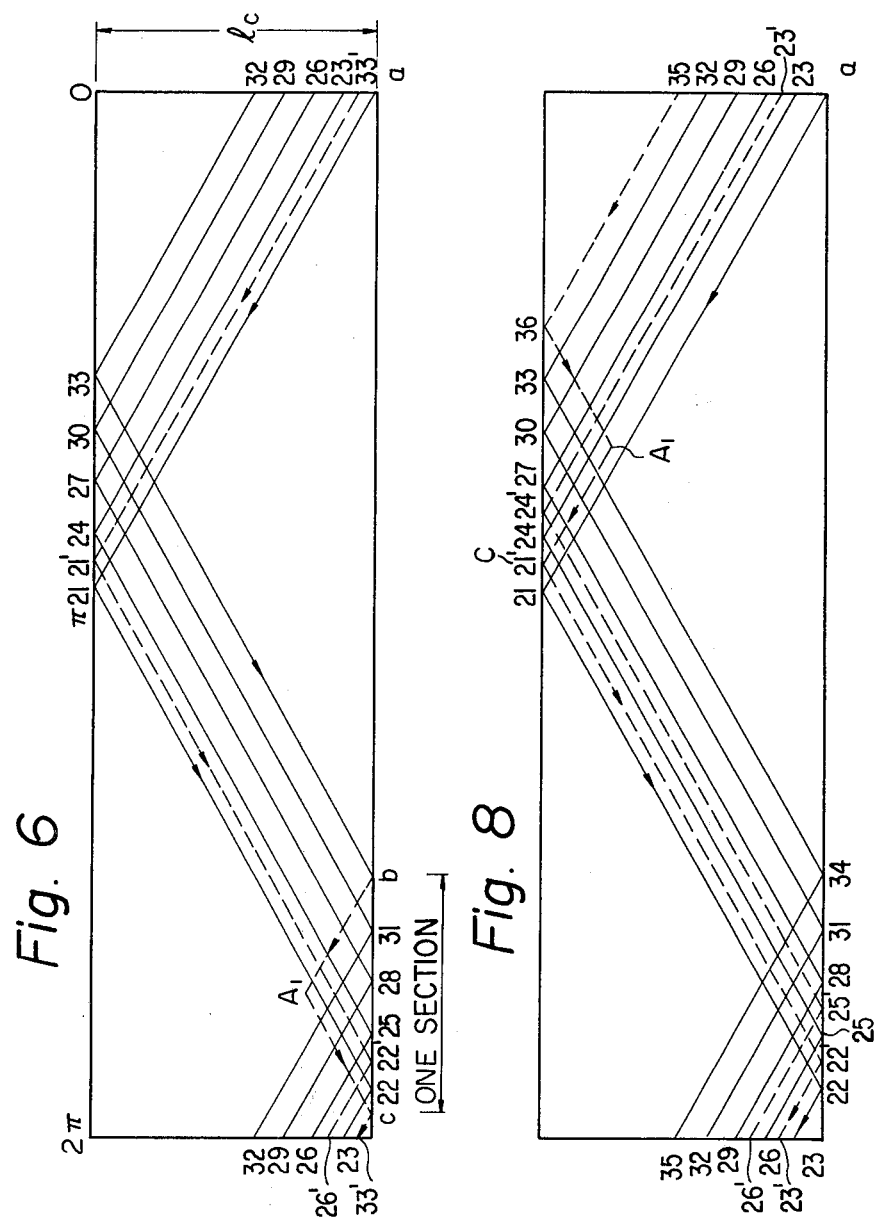

MULTILAYERED COIL STRUCTURE

This is a continuation, of Application Ser. No. 945,836, filed Sept. 26, 1978 now abandoned.

The present invention relates to a multilayered coil structure adapted for use in coreless motors.

In an ordinary coreless motor shown in FIG. 1, a cylindrical cup-shaped yoke 1 is provided at the center of its bottom portion with an insulating central support member 2, on which mounted is a cylindrical permanent magnet 3 disposed coaxially within the yoke 1. In a center hole of the support member 2, a rotary shaft 5 is rotatably supported as born by insulating bearings 4 so that the shaft 5 will extend axially through the magnet 3, and a cylindrically wound rotor coil 6 is coupled to an inner end of the shaft 5 by means of an insulating disk 7 so that the coil 6 is disposed coaxially and rotatably in a cylindrical magnetic gap between the cup-shaped yoke 1 and the cylindrical magnet 3. The disk 7 secures on one surface opposite to the shaft 5 a plurality of commutator segments 8 arranged radially and connected to the coil 6, and brushes 9 for supplying a source power to the commutator segments 8 are brought into contact with them as supported by an insulative closure disk 10 of opened edge of the yoke 1.

For the rotor coil of the motors having the above structure, there has been usually employed a multilayered coil specifically in the case when it is desired to increase the motor torque. FIG. 2 shows schematically an example of the multilayered coil such as disclosed in the U.S. Pat. No. 3,360,668, wherein 11 is an inner coil forming the first layer and 12 is an outer coil forming the second layer and these first and second layer coils are wound sequentially. For the purpose of mutually connecting the separately wound coils of the first and second layers, the first layer coil 11 is provided with, for example, three intermediate taps 13, 14 and 15 while the second layer coil 12 is provided similarly with three intermediate taps 16, 17 and 18, and these taps are respectively cut into two portions, that is, for example, the tap 13 is cut into tap portions 13' and 13'' as shown in FIG. 3 and these portions are mutually connected to form connections 13'-16'', 13''-17', 14'-17'', 14''-18' and so on. Such coil structure requires, therefore, combersome steps of forming the taps, cutting them in two and mutually connecting the cut tap portions, and the respective steps must be repeated depending on the number of the taps which corresponds to the number of the commutator segments, so that the manufacture of the coil as well as the motor of the kind referred to has to become complicated and expensive. The present invention has been suggested to remove these drawbacks of the conventional multilayered coil.

According to the present invention, the above-mentioned drawbacks has been successfully removed by a provision of a cylindrical coil of a multilayer structure wherein an inner coil and an outer coil are continuously wound for each coil section corresponding to each commutator segment, namely for each circumferential length of $\pi d/n$ of the cylindrical coil, wherein n being the number of commutator segments so that the entire coil structure will be wound continuously as a whole.

Principal object of the present invention is, therefore, to provide a multilayered coil structure which is easy to manufacture.

Another object of the present invention is to provide a multilayered coil structure wherein the order of coil winding is less perturbed in the vicinity of crossing parts of coil wire connecting between the respective layers of respective coil sections.

Still another object of the present invention is to provide a multilayered coil structure allowing a high-density winding.

Other objects and advantages of the present invention will be made apparent from the following detailed description of preferred embodiments thereof shown in accompanying drawings, in which:

FIG. 6 is a developed view of a coil according to another embodiment of the present invention for showing schematically its winding manner;

FIG. 8 is a developed view of a coil according to a further embodiment of the present invention for showing schematically its winding manner.

Figure 1:
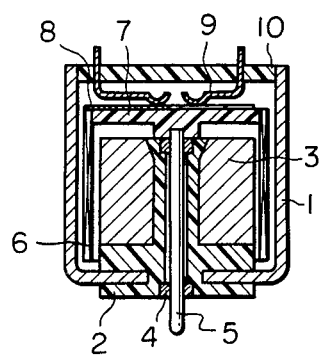
FIG. 1 is a schematic sectioned view of an exemplary structure of general coreless motors.
Figure 2:
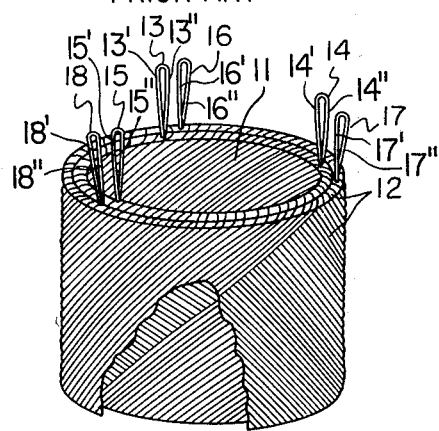
FIG. 2 is perspective view showing schematically an example of conventional multilayered coil.
Figure 3:
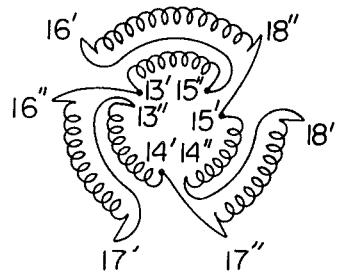
FIG. 3 is a diagram showing the manner in which the respective coil sections are connected between the respective layers in the case of FIG. 2.
Figure 4:
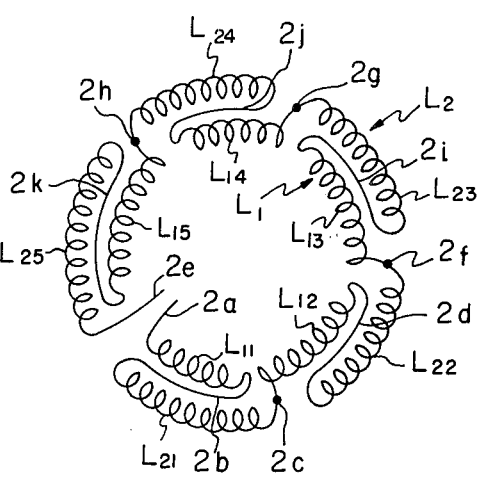
FIG. 4 is a diagram for explaining the connection in a coil according to an embodiment of the present invention as shown in FIG. 5.
Figure 5:
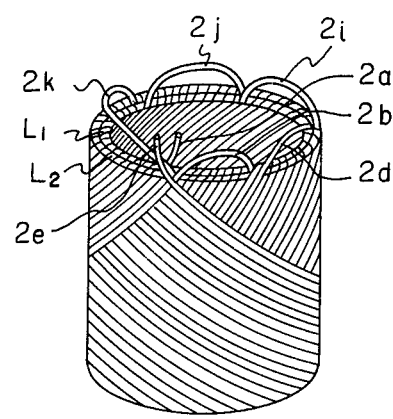
FIG. 5 is a perspective view showing schematically a coil according to an embodiment of the present invention.

Referring to a first embodiment of the present invention with reference to FIGS. 4 and 5, respective coil sections $L_{11}$, $L_{12}$, $L_{13}$, $L_{14}$ and $L_{15}$ disposed along an internal circular position form a first layer $L_1$, and other coil sections $L_{21}$, $L_{22}$, $L_{23}$, $L_{24}$ and $L_{25}$ disposed along an outer circular position form a second layer $L_2$. A coil wire is wound to run diagonally from an axial end edge to the other of a cylindrical shape and sequentially side to side as folded back at each of the edges as seen in FIG. 5 which illustrates a case of five commutator segment, i.e. $n=5$ as an example. $2a$ is the start point of the entire coil from which the coil section $L_{11}$ of the first layer $L_1$ extends a circumferential length of $\pi d/5$ and then, via a crossing part $2b$, the coil forms the outer layer from a point corresponding to the start point $2a$ to extend a circumferential length of $\pi d/5$ outside along the section $L_{11}$ so as to form the section $L_{21}$ of the second layer $L_2$. The coil further continues, via a crossing part $2c$, to form the inner first layer section $L_{12}$ which extends a circumferential length of $\pi/5$, the terminating end of which is connected, via a crossing part $2d$, to the outer second layer section $L_{22}$. The inner first layer sections $L_{11}$–$L_{15}$ and outer second layer sections $L_{21}$–$L_{25}$ are wound in this manner over the entire circumference of the coil's cylindrical shape. Thus, the multilayered coil of the present invention is formed in a remarkably simplified continuous manner as readily seen in FIG. 5, without requiring the conventional formation of intermediate taps and connection of cut parts of the taps. The crossing parts, except for crossing part $2a$–$2e$ which constitutes the interconnection between the ends of the coil wire, are thus integrally continuous in the sense that they have never been broken and reconnected.

Figure 7:
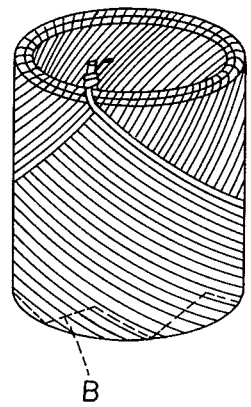
FIG. 7 is a perspective view of the coil according to the embodiment of FIG. 6.

In FIGS. 6 and 7, there is shown a second embodiment which provides a multilayered coil having smoothly formed end edges of the coil's cylindrical shape. In FIG. 6 showing the manner of coil winding in a developed view of the coil, respective solid lines represent respective turns of the coil wire in the first or inner layer while broken lines represent respective turns of the coil wire in the second or outer layer. The initial turn of the inner layer extends diagonally in alternate directions between the both edges in the order of 21→22→23→24 . . . , while the initial turn of the outer layer extends diagonally in the order of turns 21'→22'→23'→24' . . . In this structure, a wire turn 21'-22' of the second layer, for example, is located adjacent to and between wire sections turns 21-22 and 24-25 of the first layer, and such turns are arranged as if rods are piled in two layers. In this case, the crossing part of the wire between the final turn 31-32 33-b of the first layer and the initial turn c-33'-34'-22' of the outer layer defines a path b-$A_1$-c as shown with broken line in FIG. 6. In this structure, the crossing part b-$A_1$-c includes a first portion b-A, extending parallel to a wire turn 31-32-33 of the first layer. The crossing part is again folded back at a point $A_1$ in the vicinity of the intersection of turns 21-22 and 31-32 to form a second portion extending parallel to turn 21-22. The wire is then folded back again at the edge point c to be shifted into the initial turn of the next section of the second layer. The folding point c is located between the points a and 22 on the same edge and is displaced from the point 22 by a distance equal to a half of the wire diameter.

It will be appreciated that the turns of the coil extend diagonally and completely circumferentially since each turn extends along opposite sides of the coil. The coil comprises a plurality of coil sections, each section including an inner layer and an outer layer. Each inner and outer layer includes an initial turn and a final turn. The crossing part of a given coil section interconnects a termination point of the final turn of the inner layer with the initial turn of the outer layer such that the initial and final turns of the outer layer are disposed adjacent to the initial and outer turns, respectively, of the inner layer. For example, in the embodiment described in connection with FIG. 6, the inner layer of the first coil section has an initial turn 21→22→23→24 and a final turn 31→32→33-b. The crossing part b-$A_1$-c interconnects the termination point b of that final turn with the initial turn c-33'→21'→22' of the outer layer of the same coil section. The crossing part is located axially inwardly of the associated axial end of the coil and is positioned in between the inner and outer layers.

FIG. 7 shows in a perspective view the coil formed in the above described manner, wherein broken B indicates the thrus-formed crossing parts. In the case of, for example, n=5, there will be provided five of such crossing parts.

FIG. 8 shows a further embodiment in which the folded crossing parts are provided along the other edge of the cylindrical coil. Other arrangements of the wire turns are the same as those shown in FIG. 6.

According to the embodiments of FIGS. 6 to 8, there are provided such advantages that:

(1) Smooth formation of the entire coil can be easily achieved as the crossing parts of the wire are not disposed out of the axial end edge of the coil.

(2) Any accident resulting from a rare arrangement of turns, shortcircuit specifically between the crossing parts and wire breakage can be prevented, as the wound coil turns are less perturbed at the crossing parts.

(3) Axial length or height of the coil can be stabilized to be uniform over the entire axial edge.

(4) The same winding manner can be applied equally to the multilayered coils of more than two layers.

What is claimed is:

1. A cylindrically-shaped multilayered coil structure for use in coreless motors, comprising more than two coil sections each having a width equal to the circumference of the cylindrical coil structure divided by the number of coil sections, each coil section including at least inner and outer coil layers extending diagonally between opposite axial ends of the cylindrical coil structure, each such layer including a plurality of turns of a coil wire which extend diagonally completely around the circumference and forming an initial turn and a final turn, the initial and final turns of each outer layer being disposed adjacent to said initial and final turns, respectively, of the inner layer of the same coil section, each coil section including a crossing part interconnecting the final turn of the inner layer with the initial turn of the outer layer, each crossing part being of one integral piece and being continuous and unbroken from the final turn of the associated inner layer to the initial turn of the associated outer layer, each crossing part disposed axially inwardly of the axial end at which it is located, and being positioned in between the associated inner and outer layers.

2. A multilayered coil structure according to claim 1, wherein each crossing part includes first and second angularly related portions, said first portion extending from the final turn of the associated inner layer toward the opposite axial end of the coil structure, and said second portion extending from the end of said first portion toward the axial end at which said crossing part is disposed.

3. A multilayered coil structure according to claim 1, wherein there are five said coil sections.

4. A method of fabricating a cylindrically-shaped multilayered electrical coil for use in coreless motors, comprising the steps of:

(A) forming an inner layer of a first of a plurality of coil sections, each said coil section including a plurality of turns of a coil wire extending diagonally between opposite axial ends of the cylindrically-shaped coil and along a portion of the circumference of the cylindrically-shaped coil, by winding a coil wire diagonally completely around the circumference for said plurality of turns such that said inner layer of said first coil section includes an initial turn and a final turn, said final turn terminating at either of said axial ends, (B) forming a first crossing part of said coil wire by extending said coil wire from a termination point of said final turn back to a location adjacent said initial turn at the same axial end as said termination point, said first crossing part being disposed inwardly of such axial end, (C) forming an outer layer of said first coil section upon the outer periphery of said inner layer of said first coil section and upon said first crossing part of extending said coil wire from a termination point of said first crossing part and winding said coil wire diagonally completely around the circumference for a plurality of turns, such that said outer layer of said first coil section includes initial and final turns disposed adjacent to said initial and final turns, respectively, of said inner layer, (D) forming an inner layer of a second coil section by extending said coil wire from said final turn of said outer layer and winding said coil wire diagonally completely around the circumference for a plurality of turns such that said inner layer of said second coil section includes an initial turn disposed adjacent to said final turn of said inner layer of said first coil section, and a final turn, the latter turn terminating at either of said axial ends, (E) forming a second crossing part of said coil wire by extending said coil wire from a termination point of said last-named final turn back to said initial turn of said inner layer of said second coil section at the same axial end as said last-named termination point, said second crossing part being disposed axially inwardly of each axial end, (F) forming an outer layer of said second coil section upon the outer periphery of said inner layer of said second coil section and upon said second crossing part by extending said coil wire from said second crossing part and winding said coil wire diagonally completely around the circumference for a plurality of turns, such that said outer layer of said second coil section includes initial and final turns disposed adjacent said initial and final turns, respectively, of said inner layer of said second coil section, and (G) continuing to form inner and outer layers of remaining coil sections such that inner and outer layers of a last coil section have final turns disposed adjacent the initial turns of said inner and outer layers, respectively, of said first coil section.

5. A method according to claim 4, wherein each said crossing part includes a first portion extending toward the opposite axial end, and a second portion extending back toward said axial end at which said crossing part is disposed.

6. A method according to claim 4, wherein five said coil sections are formed.

* * * * *